United States Patent
Suzuki et al.

(10) Patent No.: US 7,917,621 B2
(45) Date of Patent: Mar. 29, 2011

(54) METHOD AND SYSTEM FOR NETWORK ACCESS CONTROL

(75) Inventors: Shinsuke Suzuki, Fuchu (JP); Takeshi Shibata, Yokohama (JP); Hidemitsu Higuchi, Ebina (JP); Takao Miyabe, Kawasaki (JP)

(73) Assignee: Alaxala Networks Corporation, Kanagawa (JP)

( * ) Notice: Subject to any disclaimer, the term of this patent is extended or adjusted under 35 U.S.C. 154(b) by 957 days.

(21) Appl. No.: 11/443,355

(22) Filed: May 31, 2006

(65) Prior Publication Data

US 2006/0274768 A1  Dec. 7, 2006

(30) Foreign Application Priority Data

Jun. 1, 2005  (JP) ................................. 2005-160863

(51) Int. Cl.
*G06F 21/20* (2006.01)
(52) U.S. Cl. .............. 709/225; 726/11; 726/12; 726/13; 726/25; 726/2; 370/401; 370/398
(58) Field of Classification Search .................. 709/225; 726/11, 12, 2, 13, 25; 370/401, 398
See application file for complete search history.

(56) References Cited

U.S. PATENT DOCUMENTS

| | | | |
|---|---|---|---|
| 7,379,423 B1 * | 5/2008 | Caves et al. | 370/232 |
| 2005/0273853 A1 * | 12/2005 | Oba et al. | 726/22 |
| 2006/0203815 A1 * | 9/2006 | Couillard | 370/389 |
| 2007/0192862 A1 * | 8/2007 | Vermeulen et al. | 726/23 |

FOREIGN PATENT DOCUMENTS

JP  2006-252256  9/2006

OTHER PUBLICATIONS

Joseph V. Antrosio, Errin W. Fulp, "Malware Defense Using Network Security Authentication," iwia, pp. 43-54, Third IEEE International Workshop on Information Assurance (IWIA'05), Mar. 23-24, 2005.*
McPherson, Danny . "RFC 3069—VLAN Aggregation for Efficient IP Address Allocation." FAQs. Feb 2001. The Internet Society. <http://www.faqs.org/rfcs/rfc3069.html>.*
Sridhar, Thayumanavan. "Layer 2 and Layer 3 Switch Evolution." Internet Protocol Journal. 1.2 (1998): 38-43. Print.*
"Unauthorized Personal Computers Are Controlled by Quarantine Network", Nikkei Windows Pro, Nov. 2000 (No. 92). pp. 78-99.

* cited by examiner

*Primary Examiner* — Kambiz Zand
*Assistant Examiner* — Imhotep Durham
(74) *Attorney, Agent, or Firm* — Brundidge & Stanger, P.C.

(57) ABSTRACT

Prior art quarantine networks were implemented by two methods, the IEEE802.1x method and the DHCP method, but these methods both have different problems. The problem with the IEEE802.1x method is that it is difficult to make the transition from an existing management framework. The problem with the DHCP method is that it is difficult to prevent attacks on the network itself, and to repeat client quarantine. The present invention implements client login authentication and client security status quarantine independently, and controls layer-2 connectivity based on the respective results. This permits quarantine using an existing management framework, as well as enhancing network protection by layer-2 connection control and permitting repeat quarantine of the client using the same IP address. Moreover, by incorporating other layer-2 connectivity control mechanisms, flexible layer-2 connectivity control outside the quarantine network can also be implemented.

2 Claims, 9 Drawing Sheets

METHOD AND SYSTEM FOR NETWORK ACCESS CONTROL

CLAIM OF PRIORITY

The present application claims priority from Japanese application JP 2005-160863 filed on Jun. 1, 2005, the content of which is hereby incorporated by reference into this application.

FIELD OF THE INVENTION

This invention relates to an Internet communications control method, and more particularly to a network access control method.

BACKGROUND OF THE INVENTION

In today's enterprise networks, in order to maintain security, firewalls are installed at the boundary of an enterprise network and the Internet to prevent unlawful access and external attacks on the enterprise network. However, now that viruses are increasingly infiltrating firewalls due to portable terminals, incoming e-mail and the Web, it is becoming increasingly difficult to maintain security.

To deal with this trend, a concept referred to as a quarantine network has been proposed. When the quarantine network performs network access authentication of a client, it screens the client's security status, and accommodates virus-infected clients or unauthorized clients which do not have asset management software installed, in a segment (quarantine segment) isolated from normal clients ("Unauthorized personal computers are controlled by quarantine network," Nikkei Windows (registered trademark) Pro, November, 2004, pp. 78-89). To implement this concept, two methods, the IEEE802.1x method and the DHCP method, have so far been used.

The IEEE802.1x method is a method which, when a client requests connection permission to a layer-2 network device using IEEE802.1x, performs authentication based on the client's security status. A typical example is NAC (Network Admission Control) ("Network Admission Control", http://www.cisco.com/application/pdf/en/us/guest/netsol/ns466/c654/cdcont_0900aecd800fdd66.pdf) of the Cisco Co.

In general, in IEEE802.1x, login authentication is performed by sending a user name and password from the client to an authentication server. In a quarantine network using the IEEE802.1x method, information about the client itself, such as the version of its anti-virus software, is sent from the client to the authentication server. Based on this information, the authentication server performs authentication based on the client's security status.

The DHCP method is a method which performs authentication based on the client's security status by using either a temporary IP address or an official IP address as the DHCP address assigned to the client by the network. A typical example is Vital QIP of NEC Corp.

Once a client is connected to the network, a DHCP server first distributes a temporary IP address to a client. When the client performs web access using the temporary IP address, a quarantine server detects the web access, and returns a quarantine script to the client which performed the web access. The quarantine script is configured so that the confirmation result of the client's security status may be reported to the quarantine server. If it is determined that the client's quarantine script is secure, the quarantine server which received the report instructs the DHCP server to recover the temporary IP address assigned to the client, and assign an official IP address. Conversely, if it is determined that it is not secure, the temporary IP address remains assigned. By restricting the communication range of this temporary IP address by the filter setup of a router or a switch, a client can be isolated to a different network according to the client's security status.

SUMMARY OF THE INVENTION

The above two prior art methods have different problems. In the IEEE802.1x method, it is difficult to make the transition from an existing management framework. In the DHCP method, an attack on the network itself cannot be prevented, and it is difficult to repeat client quarantine. These problems will be described below.

In the IEEE802.1x method, an authentication function of a management tool must be implemented in an IEEE802.1x authentication session. However, it is difficult for an enterprise network which has already introduced a security monitoring tool and asset management tool, both from the viewpoints of cost and effort, to replace the existing management tools in order to introduce the quarantine network. In particular, if plural management tools are used according to the purpose (e.g., asset management and security management), in the IEEE802.1x method, the authentication functions of all the management tools must be brought together and implemented in one IEEE802.1x authentication session, and it is difficult to achieve correspondence between them.

In practice, the data format for authentication sessions in IEEE802.1x is standardized as an attribute of RADIUS. In RADIUS, the information format (e.g., user name and password) required for login authentication is standardized, whereas information (e.g., anti-virus software version) required for authentication of the client's security status is not standardized. This is because, since the definition of the client's security status differs for every site, it is difficult to standardize in a general form. Since the means which carries security information is not standardized, it is difficult to maintain interconnectivity between the software and network devices which constitute the quarantine network, and this makes introduction of the quarantine network more difficult.

In the DHCP method, network access control is performed based on the subnet of an IP address. In this method, although communication between different IP subnets can be controlled, it is difficult to avoid an attack (e.g., virus infiltration and traffic saturation) within the same IP subnet.

Moreover, DHCP authentication is a method which continuously monitors the security status of a client referring to a temporarily assigned IP address. Therefore, after official IP address assignment, it is difficult to carry out continuous monitoring of the client's security status.

In the present invention, the three aforesaid problems are solved by independently performing client login authentication and monitoring of the client's security status, and controlling the client's layer-2 connectivity based on each result.

In the invention, one IP subnet is formed from plural VLAN, and direct communication between the VLAN is prevented. Also, the range over which communication from each VLAN is possible, is modified in advance for each VLAN.

When a client completes login authentication to connect with the aforesaid IP subnet, the client submits an IP address, and is accommodated in a VLAN in which only communication with a quarantine server is possible. A switch which accommodates the client, notifies the client's accommodation status to the quarantine server.

The client which was assigned an IP address, transmits a quarantine start request to the quarantine server. When the quarantine server receives the quarantine start request, it confirms the security status of the client which transmitted the quarantine start request.

If the quarantine server determines the client to be normal, the quarantine server instructs the switch to accommodate the client in a VLAN in which normal communication can be performed. If it is determined to be abnormal, the client remains in a VLAN wherein communication can be performed only with the quarantine server.

Even after the client is accommodated in a VLAN in which normal communication can be performed, a quarantine start request is periodically transmitted to the quarantine server, and the quarantine server repeats the aforesaid quarantine operation. Hence, client reauthentification is performed periodically.

The following three problems of the prior art are resolved by the aforesaid resolving means, respectively.

In this invention, client login authentication can be performed using IEEE802.1x without modification. Also, existing asset management and security management applications can be implemented as they are, and a management server, by modifying the setup of the layer-2 switch which accommodates the client based on the management result, can perform quarantine based on the client's security status. Therefore, a quarantine network can be constructed easily without changing the existing Challenge Handshake Authentication Protocol and existing management protocol.

In this invention, only the client's layer-2 connectivity is changed, and the client's IP address does not change irrespective of its security status. Therefore, a client which has completed quarantine can continue to be monitored by implementing the existing management protocol. Also, when abnormalities are found as a result of monitoring, the network to which the client connects can be modified by sending instructions to the layer-2 switch from the quarantine server.

The client's network connectivity is controlled by the aforesaid resolving means on a layer-2 level based on the client's address. Therefore, attacks on the network itself can be suppressed to the minimum.

This invention not only resolves the three problems of the prior art, but is also useful for implementing more flexible network access management.

Usually, in a quarantine network, user authentication and audit of the client's security status, etc. are performed by a single protocol. On the other hand, in the present invention, plural VLAN assignments are made independently based on authentication, and the required authentication is performed for each. Therefore, client monitoring can be easily performed from plural viewpoints.

By for example implementing plural security auditing protocols, the client's security status can be screened more closely. Moreover, by implementing a client communication log auditing protocol and user authentication protocol simultaneously, a user who improperly leaked information in the past can be eliminated from the network even if he has network access authorization.

DESCRIPTION OF THE PREFERRED EMBODIMENTS

The present invention is implemented at two locations, i.e., the layer-2 switch which accommodates the client, and the management server which monitors the client. Hereafter, specific examples of this will be described.

Embodiment 1

In this embodiment, an example of using a MAC-VLAN wherein the VLAN is defined by a source MAC Address, will be described. The invention can be implemented using the same method also for a port VLAN which determines the VLAN to which the client belongs in physical port units.

Figure 1:
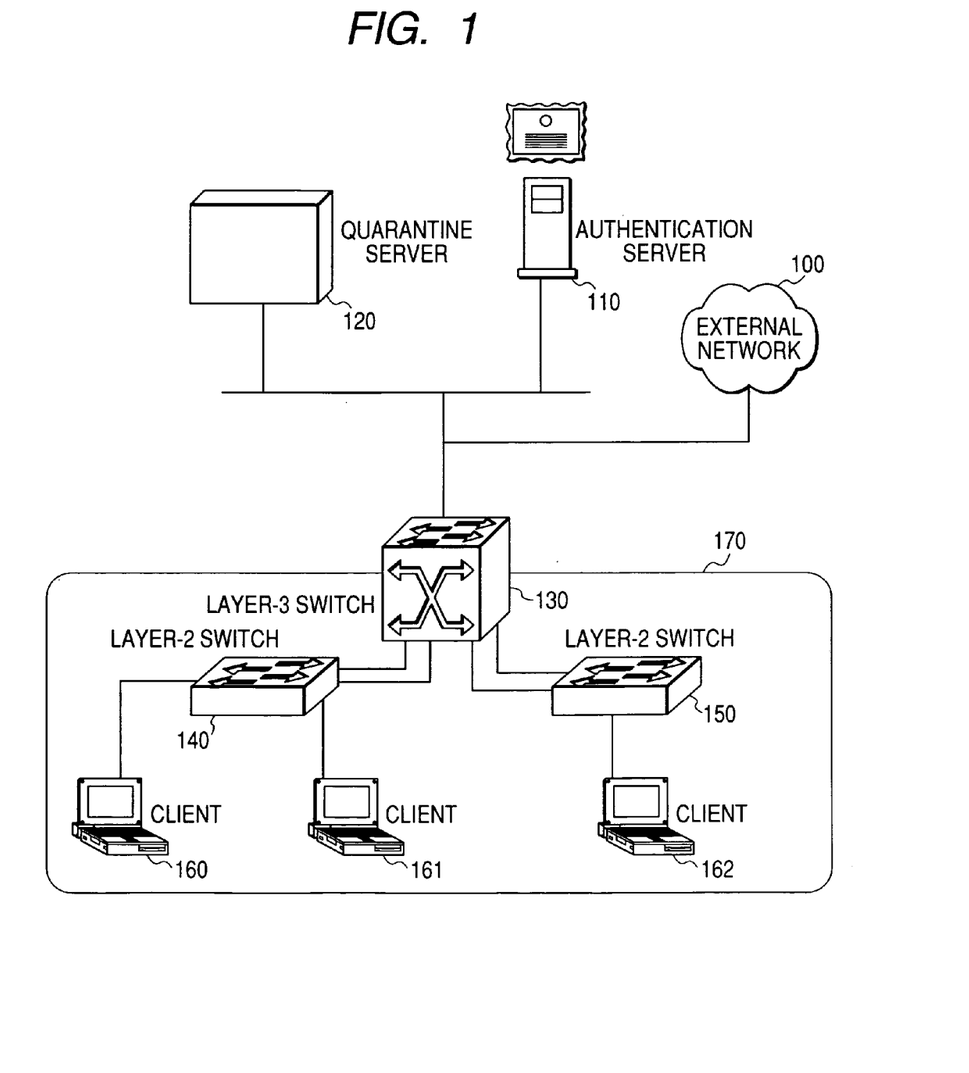
FIG. 1 is a physical block diagram of a network which is an object of the present invention.

FIG. 1 shows the physical layout of the network. Clients 160, 161, 162 which are under the control of the invention are accommodated in layer-2 switches 140, 150 which have a MAC-VLAN function. A layer-3 switch 130 accommodates the layer-2 switches 140, 150 by two circuits, and forms an IP subnet 170 which accommodates the clients 160, 161, 162. As well as the IP subnet 170, the layer-3 switch also accommodates an external network 100, authentication server 110 and quarantine server 120. The authentication server 110 is a RADIUS protocol server which communicates with the layer-2 switch, and authorizes connection to the layer-2 switch 140 of the clients 160, 161, 162 by a login name and password.

The quarantine server 120 is a server which communicates with the software installed in the clients 160, 161, 162, and determines whether or not these clients passed quarantine. The quarantine may specifically depend on the presence or absence of virus infection, or the installation status of predetermined software, etc., but any type of quarantine conditions and communications protocol used for quarantine can be used.

Figure 2:
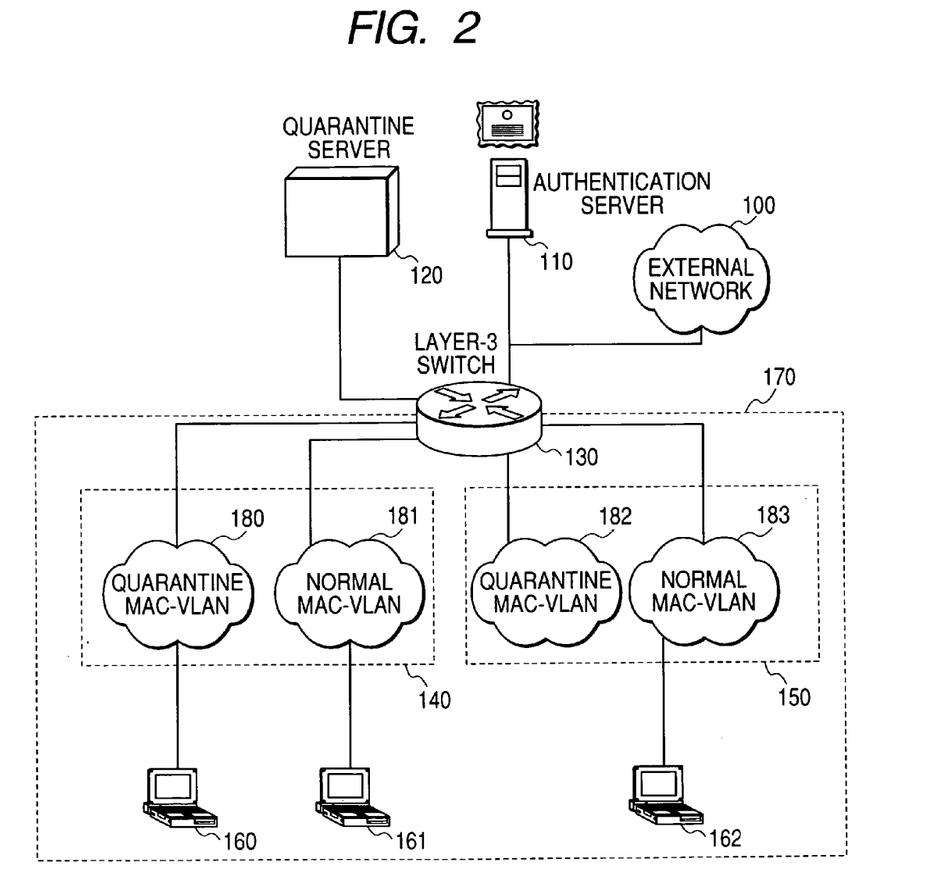
FIG. 2 is a logic lineblock diagram of a network which is an object of the invention.

FIG. 2 is a diagram showing the logic layout of the network of FIG. 1.

If the clients 160, 161, 162 pass the user authentication, they are accommodated in a quarantine VLAN 180. If they also pass the quarantine of the quarantine server 120, they are accommodated in normal VLAN 181 and 183. Both of the VLAN are in the same IP subnet 170, and the layer-3 switch 130 functions as a default gateway of the IP subnet.

Figure 3:
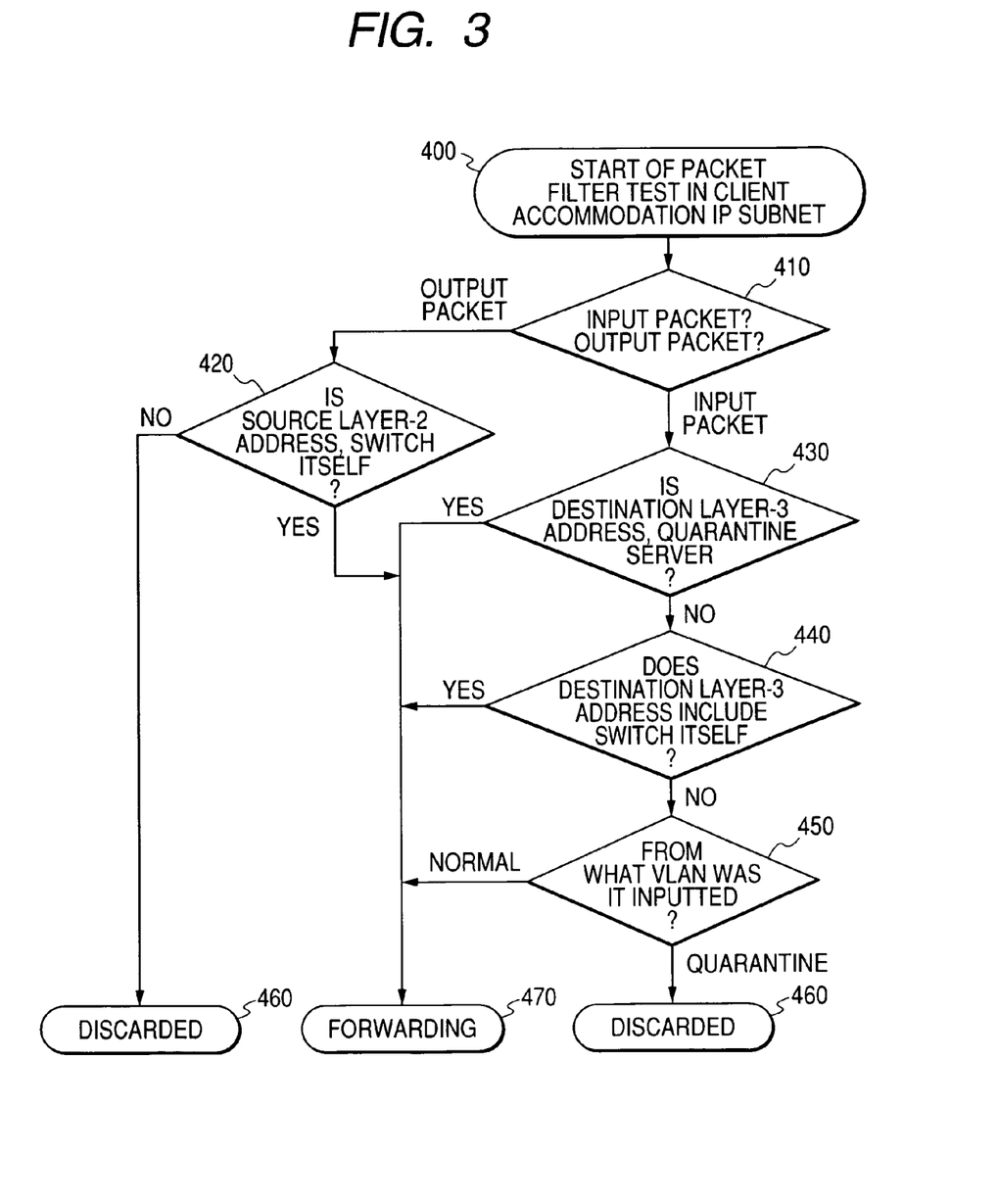
FIG. 3 is a filtering rule of a layer-3 switch in the network of FIG. 2.

The layer-3 switch 130 forwards and discards packets outputted and inputted by the IP subnet 170 according to the algorithm of FIG. 3. An input packet is forwarded from any VLAN provided that it is a packet for which the destination layer-3 address is the address of the quarantine server 120 (Step 430), or a packet for which the destination layer-3 address is the layer-3 switch itself or a multicast address containing the layer-3 switch (Step 440). If another packet is inputted, it is forwarded only when it is inputted from a normal VLAN (Step 450).

When a packet is output from the layer-3 switch to the IP subnet 170, only a packet for which the layer-2 address of the packet is the layer-3 switch itself, is forwarded (Step 420).

The layer-3 switch determines the VLAN to which the input packet belongs by the port from which the packet was inputted. In FIGS. 1 and 2, a normal VLAN and quarantine VLAN are shown connected to the layer-3 switch 130 by different physical ports, respectively, but a logical port multiplex method like IEEE802.1q can also be used.

Due to this algorithm, a packet inputted from the normal VLAN can communicate with the external network 100, quarantine server 120 and authentication server 110. On the other hand, a packet inputted from the quarantine VLAN can communicate only with the quarantine server 120 and layer-3 switch 130. Clients in the quarantine VLAN belong to a different IP subnet from that of the quarantine server 120, but since clients in the quarantine VLAN can communicate with the layer-3 switch itself, they communicate with the quarantine server 120 via the layer-3 switch. Therefore, a client which belongs to the quarantine VLAN cannot improperly perform communication with the external network 100, and cannot communicate with a client which belongs to the normal VLAN via the layer-3 switch.

If a client that belongs to the quarantine VLAN can communicate with other clients belonging to the same VLAN, this may pose a security threat. This is because, for example, a client which could not belong in a normal VLAN due to virus infection, might infect a client which has completed user authentication and is waiting for quarantine by the quarantine server. In order to prevent problems due to clients belonging to the quarantine VLAN, in the layer-2 switches 140, 150, a filter which prevents direct communication between clients in the quarantine VLAN is set up. The details of the filter are described below.

If a packet that is not from the quarantine VLAN is inputted from a physical port connected to the layer-3 switch 130, since the packet is not a packet from a quarantine VLAN client, it is permitted to pass. Also when the packet inputted into the quarantine VLAN is outputted to the same physical port, since the packet is not a packet intended for a quarantine VLAN client, it is permitted to pass. All packets inputted into the quarantine VLAN which do not correspond to either of these, are packets from quarantine VLAN clients to other quarantine VLAN clients, are therefore discarded. Due to the above filter setup, communication between clients within the quarantine VLAN can be prevented.

Hereafter, the method whereby clients are assigned to either the normal VLAN or quarantine VLAN by the layer-2 switches 140, 150, will be described.

Figure 4:
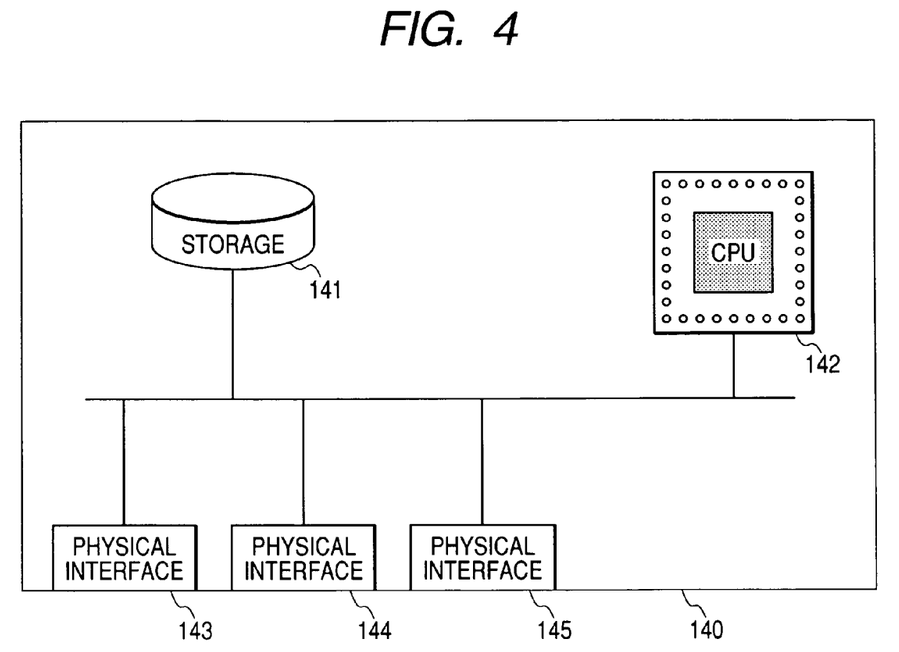
FIG. 4 is a physical block diagram of a layer-2 switch.

The construction of the layer-2 switch will therefore first be described. FIG. 4 shows the hardware construction of the layer-2 switch. The layer-2 switch is a device which control frame forwarding between the physical interfaces 143, 144, 145 by a CPU142. This frame controlling method in the CPU is implemented by a program, the program being accommodated in the storage 142.

Figure 5:
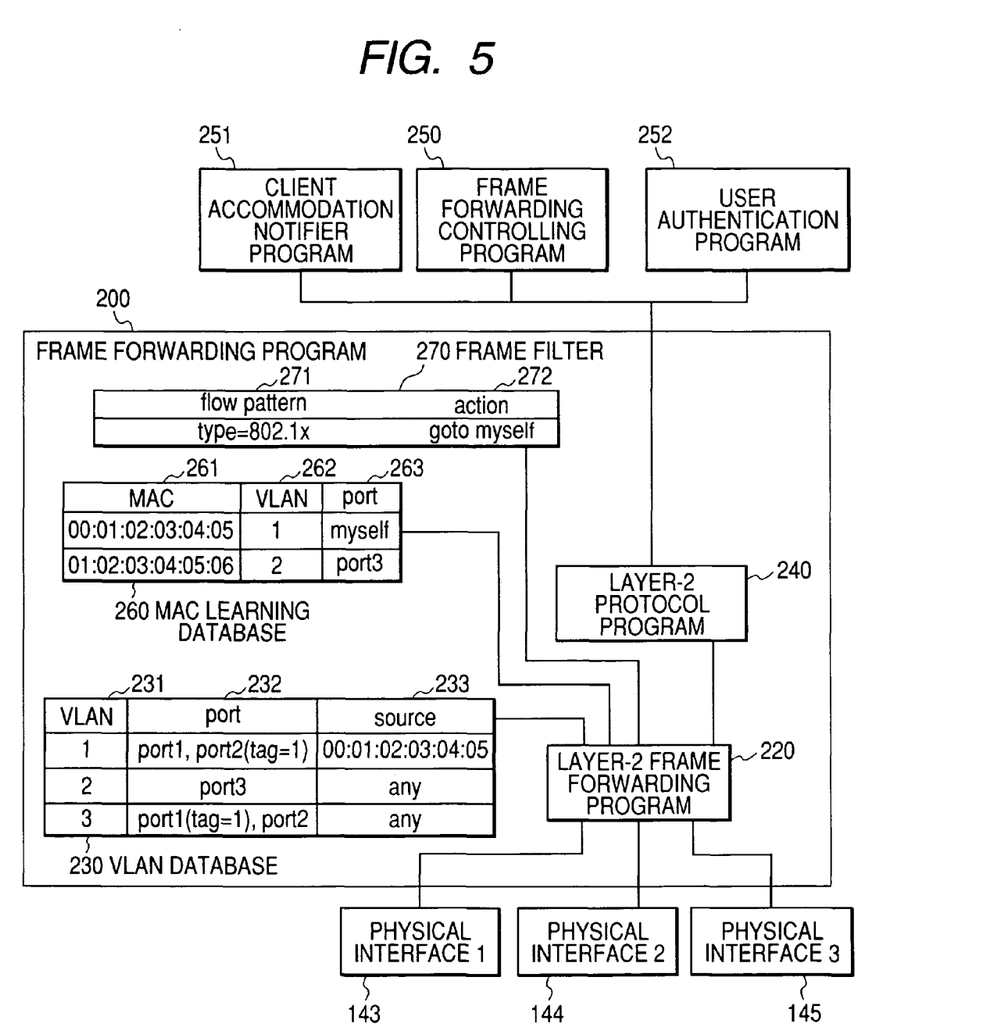
FIG. 5 is a software block diagram of the layer-2 switch.

FIG. 5 shows the software configuration of the layer-2 switch. A frame inputted into the physical interface is outputted to a suitable physical interface by a frame forwarding program 200. Hereafter, the operation of the frame forwarding program 200 will be described.

When the frame is input, a layer-2 frame forwarding program 220 determines to which VLAN the frame belongs by matching physical interface information 232 with the source MAC Address information 233 in the VLAN database 230. In IEEE802.1q, the VLAN to which the client belongs is determined by the value of a tag in the frame, and in MAC-VLAN, the VLAN to which the client belongs is determined by the source MAC Address in the frame. The VLAN database 230 is set up by the network administrator via a frame forwarding controlling program 250.

When the VLAN to which the frame belongs is determined, the layer-2 frame forwarding program 220 reflects the fact that the source MAC Address of the frame exists in the physical interface of the VLAN to which the client belongs, which was determined above, in a MAC learning database 260. The frame is simultaneously transmitted to the physical interface containing the destination MAC Address. However, if it is a frame which matches a flow pattern 271 of a frame filter 270, the frame is transmitted not to the physical interface containing the destination MAC Address, but according to an action 272 of the corresponding entry. An authentication frame as in IEEE802.1x is transmitted to a user authentication program 252 by a frame filter 270 via a layer-2 protocol program 240. As in the case of the VLAN database 230, the network administrator sets up the frame filter 270 via the frame forwarding controlling program 250. The layer-2 frame forwarding program 220, to find the physical interface from the destination MAC Address, uses the MAC learning database 260 and VLAN database 230. If there are entries in the MAC learning database 260 where the VLAN number and destination MAC Address of a frame respectively match a VLAN field 262 and MAC field 261, respectively, the physical interface shown in the port information 262 of the corresponding entry is used as the output destination. If the device itself is specified in the port information 262, the frame is passed to the layer-2 protocol program 240. If there is no matching entry in the MAC learning database, all the physical interfaces shown in the VLAN database 230 are used as output destinations. Regardless of whether or not there is a matching entry in the MAC learning database, since the frame which belongs to a certain VLAN does not reach another VLAN, the quarantine VLAN and normal VLAN cannot communicate with each other within the layer-2 switch.

A client accommodation notifier program 251 is a program which, when a new client is accommodated in the layer-2 switch, transmits the client's MAC Address, IP address and VLAN to a pre-specified server. Any protocol, such as SNMP Trap, may be used as the transmission protocol. A transmission is made when a change occurs in the contents of the MAC learning database 260, when the user authentication program 252 completes user authentication, or when an address is assigned to the client based on DHCP protocol. When the client's IP address is unknown, the address 0.0.0.0 is notified.

Hereafter, the quarantine server 120 which controls the layer-2 switch will be described.

Figure 6:
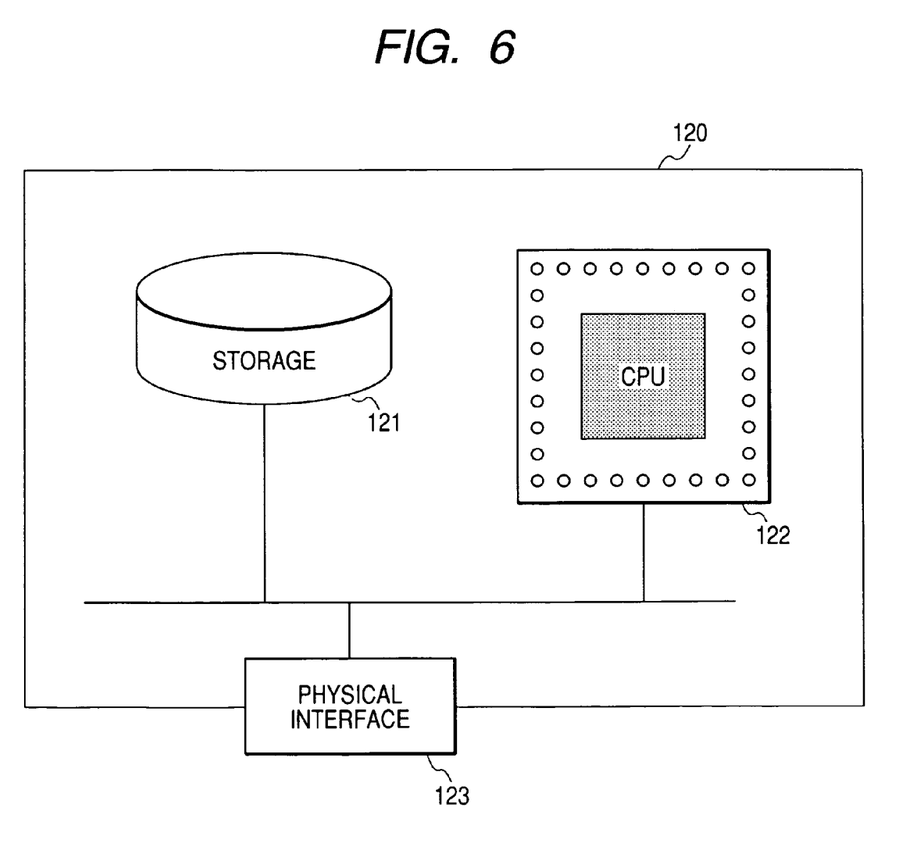
FIG. 6 is a physical block diagram of a quarantine server.

FIG. 6 shows its physical construction. The quarantine server 120 controls the layer-2 switch via a physical interface 123. A specific control algorithm is implemented by a CPU122, and the program is stored in a storage 121.

Figure 7:
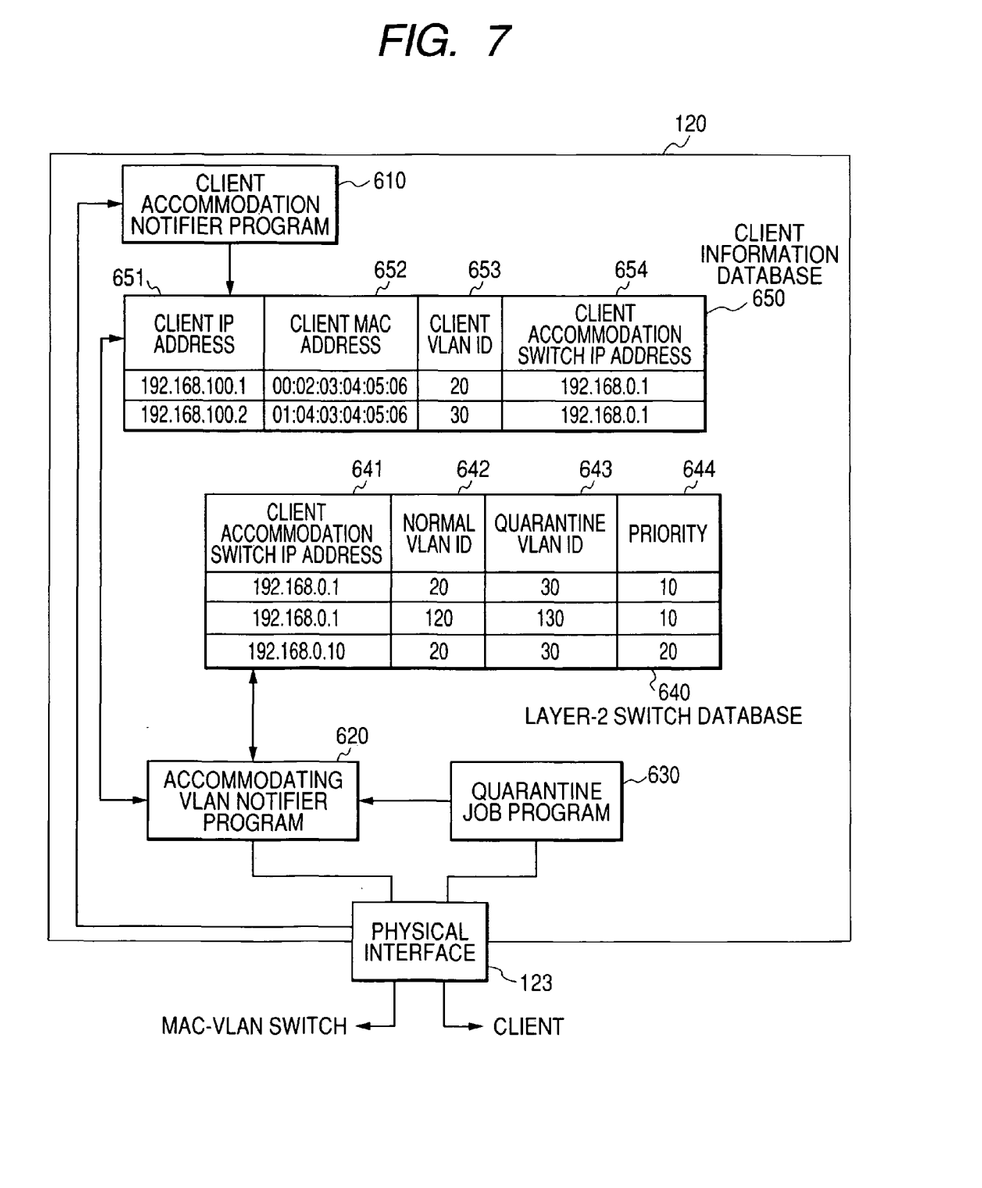
FIG. 7 is a software block diagram of the quarantine server.

FIG. 7 shows the software configuration of the quarantine server 120.

A client accommodation receiver program 610, accommodating VLAN notifier program 620 and quarantine work program 630 run on the quarantine server 120. There are also a client information database 650 and layer-2 switch database 640 which support those operations. The client information database 650 is managed via the client accommodation receiver program 610, and the administrator defines the layer-2 switch database 640 statically according to the network configuration. The quarantine work program 630 is the program which actually performs client quarantine by acquiring information from a quarantine work program client installed in the client. The quarantine work program 630 must be able to notify matching of the client's IP address and quarantine result to the accommodating VLAN notifier program 620. The information which should be acquired and the client quarantine criteria may be arbitrarily determined by the network administrator.

Figure 8:
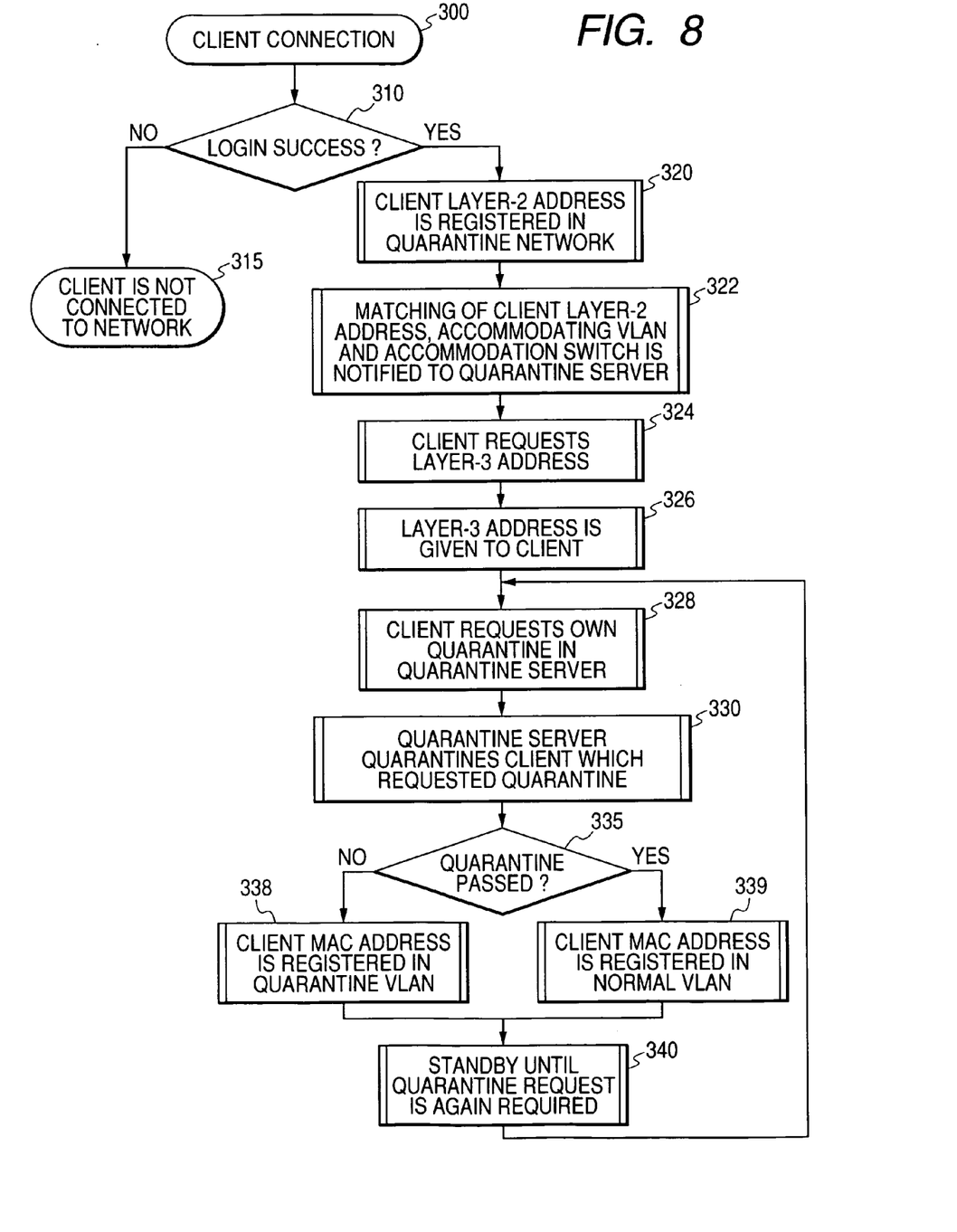
FIG. 8 is a flowchart of an algorithm by which the quarantine server modifies the client accommodating VLAN.

Referring now to the flow chart of FIG. 8, the operation of the client accommodation receiver program 610 will be described. When the user authentication program on the layer-2 switch detects a client login success by IEEE802.1x, when the client is accommodated in the quarantine VLAN, the client's MAC Address, IP address (0.0.0.0), and matching between an accommodating VLAN number and its own IP address, are notified to the client accommodation receiver program 610 by the client accommodation notifier program 251 (Step 320). Based on this notification, the client accommodation receiver program 610 reflects the client MAC Address, IP address, and matching between the VLAN to which the client belongs and accommodation switch, in the client information database 650 (Step 322). If connection to the layer-2 switch by IEEE802.1x is successful, the client requests assignment of an IP address by DHCP or Router Solicitation from the layer-3 switch in the IP subnet (Step 324). If the layer-3 switch assigns an IP address to the client according to the IP address assignment request (Step 326), the client requests to be quarantined by the quarantine server 120 (Step 328). The quarantine server receives the quarantine request from the client by the quarantine work program 630, performs a quarantine operation on the IP address for which a request was received, and determines whether or not the client passes quarantine (Step 330). According to the quarantine result, the quarantine work program 630 then requests the accommodating VLAN notifier program to accommodate the client that requested quarantine to be accommodated in a normal VLAN (Step 339) or a quarantine VLAN (Step 338). Since the quarantine job from the Step 328 is performed periodically, client quarantine can also be performed after login (Step 340).

Figure 9:
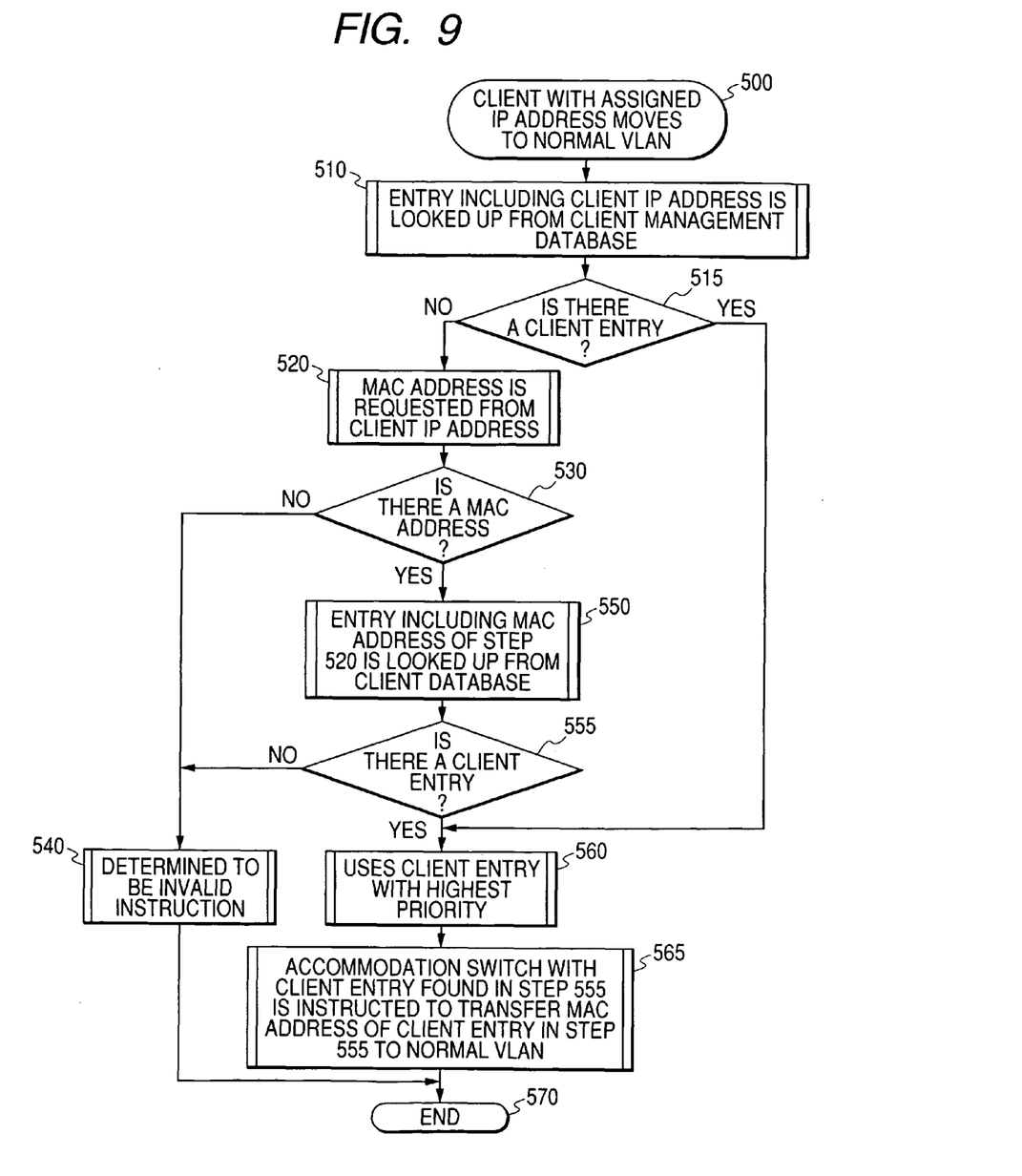
FIG. 9 is a flowchart of an algorithm by which the quarantine server notifies the client accommodating VLAN.

Referring to FIG. 9, the operation of the accommodating VLAN notifier program 620 will now be described. If a client with a certain IP address is accommodated in an normal VLAN, the accommodating VLAN notifier program requests an entry matching the IP address given by a client IP address field 651 from the client information database 650 (Step 510). If there is no corresponding IP address in the client information database, an external server such as a DHCP server, an asset management database or the layer-3 switch 130, is queried for a match between the IP address and MAC Address (Step 520), and requested for an entry containing the MAC Address found from the client information database 650 in a client MAC address field 652 (Step 550). If an entry is not found in the Step 550, or if a MAC Address is not found in the Step 520, it is considered that the accommodation notification instruction itself is invalid, and the program terminates without performing further operations (Step 540).

If there are plural client information database entries corresponding to the assigned IP address, a match is obtained with a client accommodation switch IP address field 641 of the layer-2 switch database 640 for the address in the client accommodation switch IP address field 654 of each entry. The value of a priority field 644 of each entry is compared, and the entry with the largest value is adopted (Step 560).

The client information database entry corresponding to the IP address given by the above operation and the entry in the corresponding layer-2 switch database 640 are uniquely determined. The accommodating VLAN notifier program 620 then instructs the switch in the client accommodation switch IP address field to accommodate the MAC Address in the client MAC address field 652, in the VLAN shown in the normal VLAN ID field 642 (Step 565). The VLAN accommodation instructions are implemented by remote login to the specified layer-2 switch, and executing a MAC-VLAN setting command.

Due to the communication from the client accommodation notifier program 251 on the layer-2 switch to the client accommodation receiver program 610 on the quarantine server, and the MAC-VLAN configuration definition instruction from the accommodating VLAN notifier program 620 on the quarantine server to the layer-2 switch, client login authentication and client security status quarantine can be performed independently, and the layer-2 connectivity of the client can be controlled based on each result.

In the above description, IEEE802.1x was used as the user authentication protocol, but client login authentication and client security status quarantine can be performed independently by an identical procedure even if address distribution with user authentication is performed by DHCP. If user authentication is unnecessary, client security status quarantine can be achieved by the same algorithm by notifying a contents modification of the MAC study table 650 from the layer-2 switch.

Further, by installing a quarantine server which has a different quarantine work program 630, and performing the aforesaid control also from the server, client quarantine can be implemented from plural viewpoints. For example, by running plural kinds of security auditing protocols, the security damage caused by an erroneous decision of a specific security auditing protocol can be mitigated. By running the client communication log auditing protocol as a security auditing protocol, network connection can be restricted if there was an unauthorized information leak in the past even for a client having network access authority which is deemed to be secure.

What is claimed is:

1. A network system comprising:
   a client;
   a layer-2 switch accommodating a plurality of VLANs to any one of which the client belongs;
   a layer-3 switch accommodating the plurality of VLANs;
   an authentication server coupled to the layer-3 switch; and
   a quarantine server coupled to the layer-3 switch;
   wherein:
   the quarantine server performs layer-3 quarantine of the client after layer-2 authentication of the client in the authentication server is successful; and
   the layer-2 switch modifies the VLAN accommodating the client according to VLAN modifying instructions from the quarantine server after the client is confirmed to be normal by the layer-3 quarantine, wherein further the VLAN modifying instruction indicates a change of a VLAN from a first VLAN to a second VLAN to which the client belongs,
   the layer-2 switch accommodates the client in the second VLAN accommodating only clients confirmed by layer-3 quarantine as being normal according to the VLAN modification instructions from the quarantine server, and
   the layer-3 switch discards frames if the source layer-2 address thereof is not the address of the layer-3 switch itself.

2. The network system according to claim 1, wherein the layer-3 switch further set up a filtering policy for each VLAN.

* * * * *